Oct. 23, 1945.    J. F. WEAKLEY    2,387,630
SEALING CONNECTOR TERMINAL
Filed July 8, 1943

*INVENTOR.*
J. FRANK WEAKLEY

BY *George R. Ericson*

ATTORNEY

Patented Oct. 23, 1945

2,387,630

UNITED STATES PATENT OFFICE 2,387,630

SEALING CONNECTOR TERMINAL

John Frank Weakley, St. Louis, Mo., assignor to Carter Carburetor Corporation, St. Louis, Mo., a corporation of Delaware Application July 8, 1943, Serial No. 493,939

3 Claims. (Cl. 173—339)

This invention relates to terminal connectors for electric wiring and consists particularly in a novel connector device for application to the wall of a fluid tank and which tightly seals the opening through which the wire attaching shaft or bolt passes.

Sealing devices of this type have usually embodied a fibrous packing or wedging elements which are drawn together axially by various means. The present invention provides a device which is substantially simpler and equally or more effective than these devices of the prior art.

Figure 1:
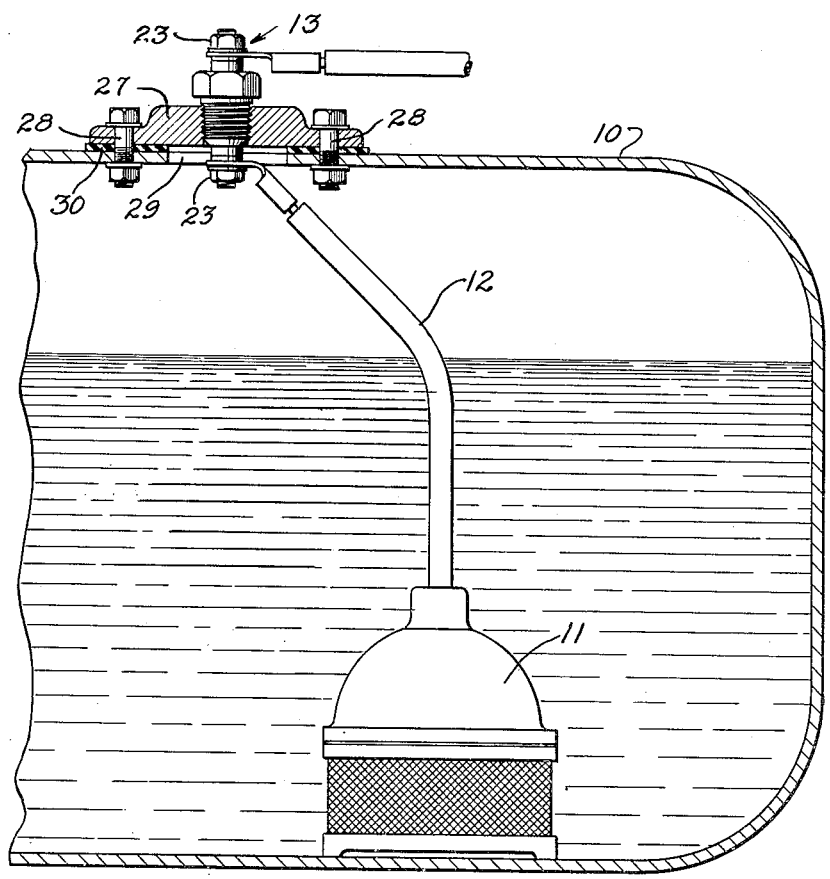
Fig. 1 is a sectional view illustrating the novel connector device applied to a fuel tank.

Fig. 1 illustrates a tank 10, which may be the fuel tank of an automobile or truck, having an electric fuel pump 11 mounted therein. The pump is connected to the carburetor of the engine by suitable piping (not shown). Wiring 12 extends upwardly from the pump and is attached to the lower extremity of the novel connector device, generally indicated at 13.

Figure 2:
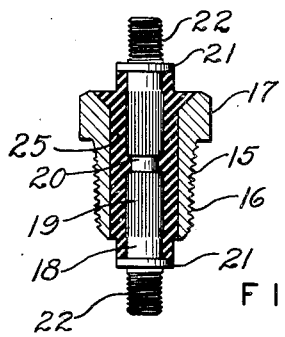
Fig. 2 is an enlarged section through the terminal connector device.
Figure 3:
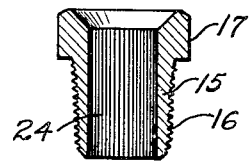
Fig. 3 is a section of the sleeve member only.

This device, better illustrated in Figs. 2 and 3, comprises a thin walled sleeve 15 having an external, tapered pipe thread 16 on its lower portion and a hexagonal, wrench receiving portion 17 thereabove. Extending axially through the sleeve is a metal shaft 18 having longitudinal serrations or flutings as at 19, a central, circumferential groove 20, and radial collars 21 near its ends. The shaft is threaded outwardly of collars 21, as at 22, for receiving the nuts 23 (Fig. 1) which attach wiring to the terminal, suitable washers being provided. The internal surface of sleeve 15 is also longitudinally serrated, as at 24. Closely fitting the space between sleeve 15 and shaft 18 and extending to collars 21 is a bushing 25 formed of a resiliently compressible material, preferably a plastic substance such as Lucite. The plastic bushing is conveniently molded into position so as to closely fit the serrations in the sleeve and shaft and extend into groove 20.

A plate 27 is attached to the top of tank 10 by bolts 28 so as to cover an opening 29 therein, a sealing gasket 30 being interposed between the plate and tank wall. This plate is provided with an internal tapered thread which is complementary to thread 16 on the connector device. Because of the tapering of these threads, sleeve 15 is slightly compressed upon being threaded into the plate and this causes squeezing of the plastic bushing so as to form a rigid, fluid sealing assembly. Various substances may be used for the bushing, which have sufficient strength and elasticity and are soft enough to become embedded in the serrations 19 and 24. The structure and use of the connector may be modified in various respects as will occur to those skilled in the art and the exclusive use of all modifications as come within the scope of the appended claims is contemplated.

I claim:

1. A sealing connector terminal comprising a thin-walled sleeve member of form sustaining material having an external, tapered thread and its inner surface cylindrical, a grooved, wire attaching shaft extending thereinto, and a bushing of resilient, plastic material molded into the space between said members so as to be squeezed into tight, sealing engagement therewith upon application of said sleeve member to a complementary, internally threaded part.

2. A sealing connector terminal comprising a thin walled, metal sleeve having an external, tapered thread, a wrench engaging part, and internal irregularities, a wire attaching shaft extending axially thereinto and having external irregularities, and a bushing of resilient, plastic material molded into the space between said members whereby said members and said bushing will be squeezed radially into a rigid, sealing unit upon application of said sleeve to a complementary, internally threaded part.

3. The combination with a receptacle wall having a threaded orifice, of a sealing terminal connector device comprising a thin walled sleeve of form sustaining material threaded into said orifice, a metal wire attaching shaft extending therethrough, and a bushing of resilient material closely fitting the space between said sleeve and shaft, the sleeve and orifice threads being tapered whereby said sleeve is slightly contracted by threading of said sleeve into said orifice and said bushing thereby squeezed into sealing engagement with said sleeve and shaft.

J. FRANK WEAKLEY.